United States Patent [19]

Colombo et al.

[11] Patent Number: 5,191,596
[45] Date of Patent: Mar. 2, 1993

[54] APPARATUS AND METHOD FOR TIMING RECOVERY IN THE RECEPTION OF BASE BAND DIGITAL SIGNALS

[75] Inventors: Roberto Colombo; Giambattista Di Donna, both of Milan, Italy

[73] Assignee: Siemens Telecomunicazioni S.p.A., Milan, Italy

[21] Appl. No.: 488,183

[22] Filed: Mar. 5, 1990

[30] Foreign Application Priority Data

Mar. 24, 1989 [IT] Italy ............................... 19899 A/89

[51] Int. Cl.$^5$ ........................................... H04L 7/033
[52] U.S. Cl. ..................................... 375/12; 375/110
[58] Field of Search ................... 375/12, 14, 15, 110, 375/106, 101, 102, 111; 333/18; 328/55, 63, 155

[56] References Cited

U.S. PATENT DOCUMENTS

| | | | |
|---|---|---|---|
| 4,597,088 | 6/1986 | Posti et al. | 375/12 |
| 4,709,378 | 11/1987 | Wouda et al. | 375/110 |
| 4,789,994 | 12/1988 | Randall et al. | 375/12 |
| 4,941,151 | 7/1990 | Abbiate et al. | 375/110 X |
| 4,943,789 | 7/1990 | Surie | 333/18 |

OTHER PUBLICATIONS

"A BPSK/QPSK Timing-Error Detector for Sampled Receivers", Floyd M. Gardner; IEEE Transactions on Communications, vol. COM-34, No. 5, May 1986.
"Statistical Properties of Timing Jitter: a PAM Timing Recovery Scheme", Franks et al., IEEE Transactions on Communications, vol. COM-22, No. 7, Jul. 1974.
"A New Selective Fading Model: Application to Propagation Data", W. D. Rummler, B.S.T.J., vol. 58, pp. 1037-1071, May-Jun. 1979.

Primary Examiner—Benedict V. Safourek
Attorney, Agent, or Firm—Adel A. Ahmed

[57] ABSTRACT

A timing recovery circuit of the sampling type uses two signal samples per symbol time and utilizes a control signal (for a local oscillator which generates the timing signal) which is given essentially by the product of a reconstruction error signal, derived at the generic sampling instant, multiplied by the difference between the values of the reconstruction symbols, taken at one-half symbol interval respectively before and after said sampling instant. The derived control signal allows generation of a timing signal which positions with extreme accuracy and stability the sampling instant of the received signal at the minimum points of the mean square error curve, even under selective fading conditions.

7 Claims, 2 Drawing Sheets

APPARATUS AND METHOD FOR TIMING RECOVERY IN THE RECEPTION OF BASE BAND DIGITAL SIGNALS

BACKGROUND OF THE INVENTION

1. Field of the Invention

The present invention relates to the field of digital transmission and more specifically to an apparatus and method for timing recovery in the reception of base band digital signals.

2. Description of the Prior Art

One of the main problems in data receiving and transmitting devices, such as modems, is the correct reconstruction of the received timing signals, whatever the transmission channel adopted (coaxial cable, optical fiber, radio link, etc.).

In particular, it is desired to reconstruct and use the received timing signal downstream of the demodulator assuming that on the transmission channel there is only the data signal and not the timing signal.

The received timing signal is reconstructed and serves to sample at regular time intervals and hence read the received data signal correctly.

For some kinds of modulation, e.g. multilevel QAM modulation (16-QAM, 64-QAM, 256-QAM) and always where there is strong intersymbol interference due to dispersion phenomena on the transmission channel, e.g. selective fading, for correct interpretation of the received signal, positioning of the sampling instant inside the associated interval becomes critical.

Various timing recovery devices are presently known in the reception base band of digital signals. The use of such known devices becomes problematic when it is necessary to position with extreme accuracy and stability the instant of sampling of the signal received because of the following main shortcomings:

drift of the optimal sampling instant for thermal or ageing reasons, found particularly in devices which require setting of the timing signal phase;

volatility of the control signal of the timing signal phase, encountered in all devices which control the phase automatically with certain algorithms, because the control signal often has an intrinsic noise which creates an unacceptable jitter on the sampling instant;

insufficient accuracy of the control signal due to the fact that the position of the sampling instant is optimal in the presence only of thermal noise on the transmission channel or not in the presence of selective fading.

An example of a known timing recovery system is described in the article by L. E. Franks, G. B. Bubrousky entitled "Statistical properties of timing jitter in a PAM timing recovery scheme", IEEE Transactions on Communications, Vol. COM-22, pages 913-920, Jul. 14, 1974.

This known system extracts a clock-frequency line from the spectrum of the received data signal, either in the intermediate frequency or in the base band, by a nonlinear operation and subsequently filters said line with a narrow band filtering. This system is still much used today in the practical embodiment of QAM demodulators and is often preferred to more recent systems for its simplicity, operating safety, which depends neither on the reconstruction loop of the carrier nor on the equalization control loop in base band, and for fair behavior in the presence of selective fading.

Unfortunately this known system has shortcomings, the most serious of which is drift, either thermal or due to ageing, of the optimal sampling instant.

More recent known sampling systems display uncertain behavior in the presence of selective fading. This is due mainly to crumbling of the sensitivity of the so-called S-curve (defined below and the behavior of which indicates the value of the timing recovery algorithm) with increase of intrinsic noise and precariousness of convergence of the algorithm which controls the timing signal phase. Zero-crossings of the S curve in undesired timing positions are also encountered particularly at pejorative values of the mean square error. Ordinarily these systems use a single signal sample per symbol time and do not allow extraction of sufficient information for reconstruction of the timing signal.

There was recently proposed a timing recovery device of the sampling type using two signal samples per symbol time and described in the article by F. M. Gardner "A BPSK/QPSK timing error detector for sampled receivers", IEEE Transactions on Communications, Vol. COM-34, pages 423-429, May 14, 1986. The algorithm made with this device makes timing recovery independent of the carrier phase and hence of the reconstruction loop thereof but still has the shortcoming that the sensitivity of the S-curve at the sampling instant is not very high. In particular under conditions of selective fading the zero-crossing points of the S-curve do not coincide with the minimum points of the mean square error, obtaining higher error probability.

SUMMARY OF THE INVENTION

Accordingly the present invention overcomes the above-mentioned shortcomings of the prior art and provides a method and timing recovery device of the sampling type, which uses two signal samples per symbol time, for reception of base band digital signals. The device obtains a control signal (for a local oscillator which generates the timing signal) given basically by the product of an error signal, evaluated at the generic timing instant, and the difference between the values of the reconstructed symbols, taken at one-half symbol interval respectively preceding and following said sampling instant. The control signal thus obtained allows generation of a timing signal which positions, with extreme accuracy and stability, the sampling instant of the received signal at the minimum points of the mean square error curve even under selective fading conditions.

Other objects and advantages of the present invention will become apparent with reference to the following detailed description and by the accompanying drawings.

DETAILED DESCRIPTION OF THE EMBODIMENT

Figure 1:
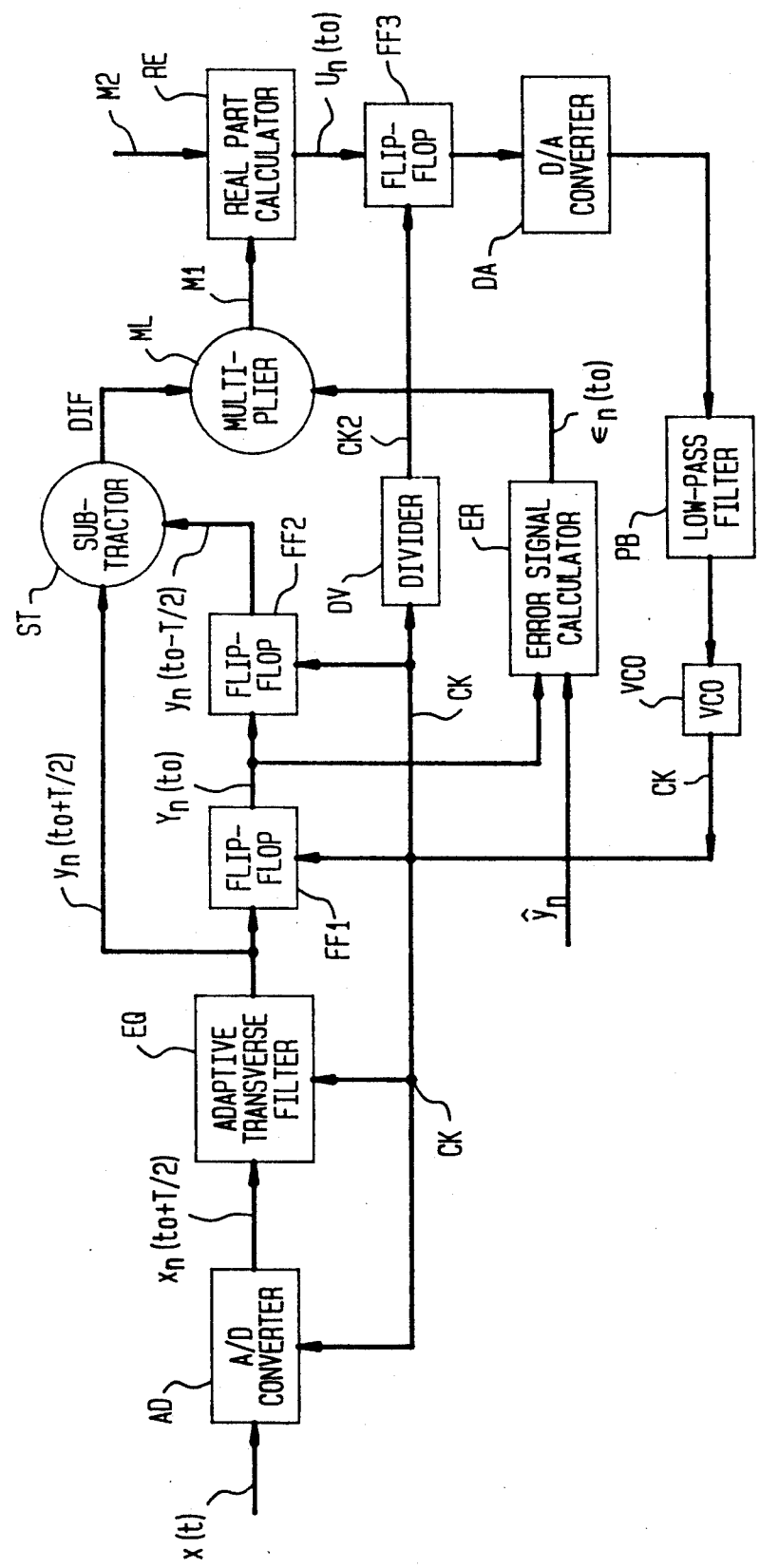
FIG. 1 shows a circuit diagram of apparatus in accordance with the present invention.

FIG. 1 shows a circuit realization of the invention. Before describing a detailed description of the circuit, a functional description of the sequence of operations performed is provided. Reference is made to FIG. 1 as regards the symbols adopted to indicate the various electrical signals.

The timing recovery device of the invention processes a demodulated signal in reception x(t) appropriately converted into a sequence of symbols $x_n(t)$ where n is the symbol index and t varies in the fundamental symbol interval T.

Processing leads to the obtaining of a signal $U_n(t)$ for control of a feedback structure comprising a voltage controlled local oscillator (VCO). The VCO generates a timing signal (CK) used to sample the demodulated signal $x_n(t)$ and take a reconstructed signal in reception $y_n(t)$. Since there are two demodulated signal samples taken for symbol time T the timing signal (CK) will have a nominal frequency double that of the symbol. In addition the demodulated signal $x_n(t)$ and the signal reconstructed in reception $y_n(t)$ are understood to be composed of sample sequences $x_n(to)$ and $y_n(to)$ respectively, where 'to' is the generic sampling instant. From the sequence of samples $y_n(to)$ there will be obtained a sequence of signals reconstructed in reception.

As is known, the demodulated signal x(t) is understood as complex and consisting of a real part which represents the signal in phase and an imaginary part which represents the signal in quadrature.

Let $d_n$ indicate the sequence of symbols transmitted, likewise complex and assumed stationary, with zero mean-value and independent symbols.

So that the control signal $U_n(t)$ will be able to lock the local oscillator (VCO) to the transmission timing signal, it is necessary that the function $\overline{U}_n(to)$ have a single zero crossing with a given slope, e.g. positive, in the symbol interval T which includes 'to' and that the instant of crossing correspond to a minimum value of mean square error.

The function $\overline{U}_n(to)$, known in the art and hereafter called S-curve, represents the mean value of $U_n(to)$. The value of 'to' for which the S-curve is zero represents the sampling instant.

The expression of the received signal with reference to the sample of the generic instant of sampling 'to' will be:

$$x_n(to) = \sum_k d_{n-k} \cdot h(to - kT) \quad (1)$$

where h(t), with $t = to - kT$, is the pulse response of the entire transmission channel given by an expression of the type:

$$h(t) = g(t) \otimes \{\delta(t) - p\delta(t-\tau)e^{j2\pi f_n\tau}\} \quad (2)$$

i.e. given by the convolution product of a function (g)t which satisfies the first Nyquist criterion and another time function which represents the transmission channel affected by selective fading.

This agrees with the model described by W. D. Rummler in the article "A new selective fading model: application to propagation data", B.S.T.J., Vol. 58, pages 1037–1071, May–June, 1979. In this model, called "two rays model", selective fading is described by the amplitude of the reflected ray p, by its delay $\tau$, and by the notch frequency $f_n \cdot \delta(t)$ indicates Dirac's delta function.

In expression (2) in addition the effect of added thermal noise in the received signal is ignored because said noise doesn't influence determination of the S-curve, hence appraisal of the circuit's performance.

To partially neutralize the effects of selective fading, an equalization operation in base band, known in itself, is activated on the received samples $x_n(to)$, by means of an adaptive transverse filter (EQ) having 2L+1 taps with adaptable coefficients Ci ($-L \leq i \leq L$).

The control signal $U_n(to)$ is taken from the sequence of reconstructed samples $y_n(to)$ already equalized in base band. From the reconstructed samples $y_n(to)$ is then taken the symbol output of the receiver.

Then the pulse response of the transmission channel has to take into account this equalization, obtaining an equivalent pulse response $h_{eq}(to)$ given by:

$$h_{eq}(to) = \sum_{i=-L}^{L} C_i(to) \cdot h(to - iT) \quad (3)$$

At the generic sampling instant 'to' we have:

$$y_n(to) = \sum_k d_{n-k} \cdot h_{eq}(to - kT) \quad (4)$$

Let us define an error signal $\epsilon_n(to)$:

$$\epsilon_n(to) = y_n(to) - \hat{y}_n \approx y_n(to) - d_n \quad (5)$$

where $\hat{y}_n$ is the estimate of the sample $y_n(to)$ calculated by a decision circuit of known type in the receiver. Said estimate is constant over the whole symbol interval T including 'to' and does not depend on 'to'.

The mean square error MSE associated with the error signal at instant 'to' will be:

$$MSE = \overline{|\epsilon_n(to)|^2} \quad (6)$$

If it is desired to pursue a criterion of minimization of the mean square error in the sampling instant, for determination of the optimal instant of said sampling, in accordance with the present invention it has been determined that the control signal $U_n(to)$ is given by the following expression in complex notation:

$$U_n(to) = \Re(\epsilon_n(to)[y_n^*(to+T/2) - y_n^*(to-T/2)]) \quad (7)$$

where the symbol $\Re$ indicates the real part of the expression in parentheses, while the symbol * indicates the complex conjugated value of $y_n$.

It can be observed that in formula (7) the expression in square parentheses is an approximate differential of $y_n^*$ over with 'to', i.e. $\blacktriangle y_n^*(to)$, and hence (7) is an approximation of the expression obtained by minimizing, i.e. deriving, MSE over with 'to'.

Considering that in (5) the estimate $\hat{y}_n$ is to be considered constant compared with 'to', there is obtained:

$$\frac{\partial \overline{|\epsilon_n(to)|^2}}{\partial to} = 2 \overline{\frac{\epsilon_n \partial \epsilon_n^*}{\partial to}} = 2 \overline{\frac{\epsilon_n \partial y_n}{\partial to}} \quad (8)$$

It was stated above that the value of 'to' for which the S-curve is zero represents the sampling instant and that said instant, to also must be that for which there is a minimum in the behavior of the function MSE, i.e. it must be the instant in which there is minimal error probability in the reconstruction of the transmitted symbols.

Therefore let us verify the behavior in time of the S-curve and of MSE.

The expression of the S-curve is derived from the mean value of (7) over n, i.e.:

$$\overline{U_n(t_o)} = \frac{1}{d^2} \cdot \Re \left\{ \sum_n h_{eq}(t_o - nT) \left[ h^*_{eq}(t_o + nT + T/2) - h^*_{eq}(t_o + nT - T/2) \right] \right\} - \frac{1}{d^2} \cdot \tag{9}$$

$$\Re \left[ h^*_{eq}(t_o + T/2) - h^*_{eq}(t_o - T/2) \right] \}$$

where $\overline{d^2}$ is the mean square value of the symbol $d_n$.

In addition the coefficients $C_i(t_o)$ of the transverse filter must be recalculated at each $t_o$; therefore if the equalizer uses the criterion of minimization of the mean square error (MMSE) the coefficients will be given by the following matrix expression:

$$\vec{C}(t_o) = \overline{(A)}^{-1} \cdot \vec{h^*} \tag{10}$$

i.e. the coefficients vector $\vec{C}(t_o)$ is given by the product of an inverse correlation matrix $\overline{(A)}^{-1}$, where the generic element $a_{ij}(t_o)$ to the matrix is:

$$a_{ij}(t_o) = \sum_k h(t_o + kT - jT) \cdot h^*(t_o + kT - iT),$$

$$(-L \leq i,j \leq +L)$$

and the channel vector $\vec{h^*}$ given by $$\vec{h^*} = h^*(-LT + t_o), \ldots h^*(t_o), \ldots h^*(LT + t_o)$$

where the various components of $\vec{h^*}$ are complex conjugated values of the function (2) in successive sampling instants.

Figure 2:
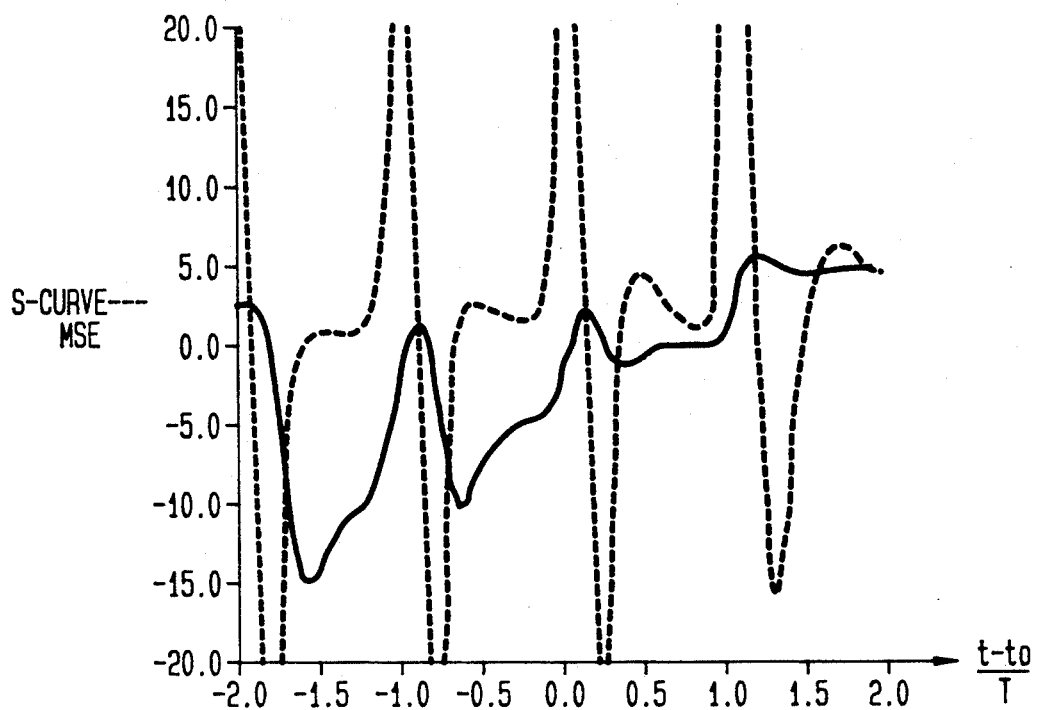
FIGS. 2 and 3 show waveforms in time of the S-curve and the mean square curve obtained by the invention of FIG. 1.
Figure 3:
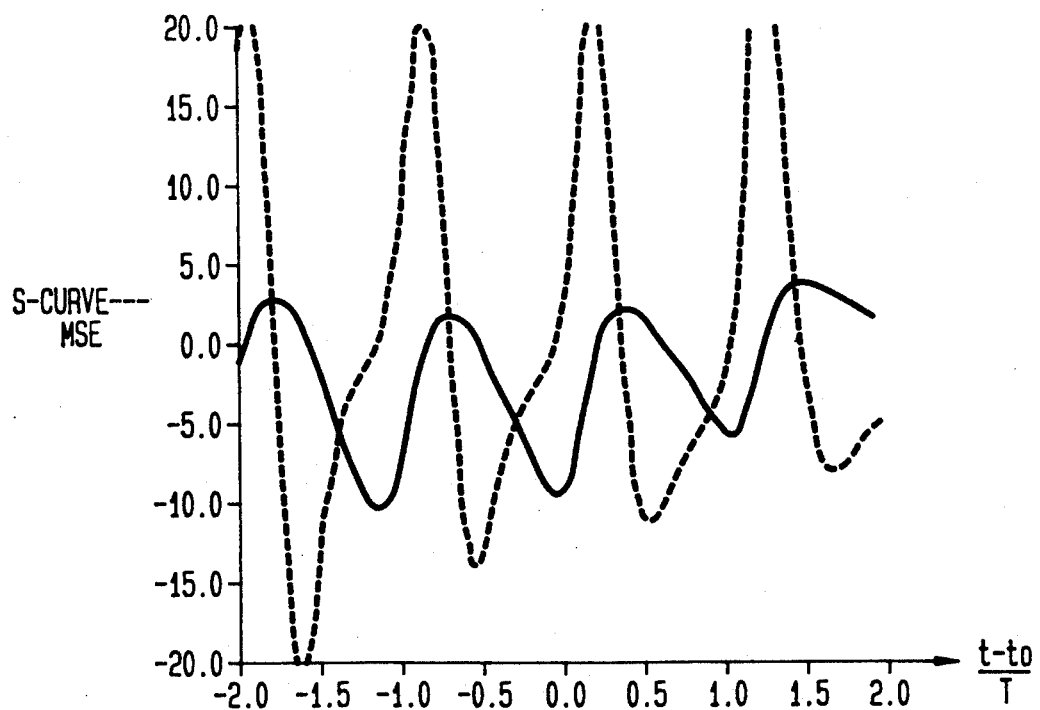

Experimental tests and computer simulations have been performed under channel conditions distorted by the presence of selective fading, with BER = $10^{-3}$, for a 16-QAM modulation system with bit-rate of 70 Mb/s, taking the trends of the S-curve and of MSE as a function of $t_o$, for two different values of notch frequency $f_n$, shown respectively in FIGS. 2 and 3. In FIG. 2 the trend for $f_n = 0.2 f_s$ while in FIG. 3 that for $f_n = 0.4 f_s$ where $f_s$ is the symbol frequency.

FIGS. 2 and 3 show on the horizontal axis a time scale normalized in relation to the symbol interval T and centered in relation to 'to' = 0, while on the vertical axis is shown a scale which is logarithmic in dB for the trend of MSE, shown by an unbroken line, and linear for the trend of the S-curve, which is shown by a broken line.

It can be seen in both figures that the sections of S-curve with a positive slope cross the zero at the same instants that the minimum MSE values occur, which is just what it was sought to obtain.

Returning to more detailed description of the circuit diagram of FIG. 1, it represents one of the two parts with which it is intended to constitute the timing recovery device of the invention. It was explained hereinbefore that the demodulated signal x(t) is complex. To obtain timing recovery its two real and imaginary components are subject to the same type of elaboration. In FIG. 1 was then shown the processing circuit diagram of only one of the two components of x(t). With the exception of the blocks indicated by RE, FF3, DA, PB, DV and VCO, which are single, the other blocks are to be understood as duplicate for each of the two components of x(t).

In FIG. 1 AD shows a normal analog-digital converter which receives one of the two components of the demodulated signal x(t) and, synchronized by the timing signal CK, supplies at the output a sequence of samples of the received signal consisting of two samples per symbol time T. Each sample is quantified with m bit, e.g. m = 8.

For temporal congruence with the other signals of FIG. 1, at the output of AD the sample is assumed to be taken at instant $t_o + T/2$ and is so indicated in the figure by $x_n(t_o + T/2)$ EQ indicates an adaptive transverse filter of known type having 2L + 1 taps and which embodies the base band equalization function of the sequence of samples $x_n(t_o + T/2)$ in accordance with formulas (3), (4) and (10). As the structure of the EQ filter is basically known, one skilled in the art is capable of making it on the basis of the indications supplied above, for example letting L = 5.

EQ is synchronized by the timing signal CK and supplies at the output the sequence of reconstructed samples already equalized and represented with m bits; here too for temporal congruence the sample $y_n(t_o + T/2)$ is considered taken at the instant $t_o + T/2$.

FF1 and FF2 indicate two blocks connected in cascade, each including m flip-flop, and used as delay elements for the sequence of reconstructed samples $y_n(t_o + T/2)$ received from EQ. Each of the two blocks delays by a time equal to T/2 the received samples, being synchronized by the signal CK which has a frequency double the symbol frequency.

FF1 receives the samples $y_n(t_o + T/2)$ and supplies the samples $y_n(t_o)$. The output of FF1 is also one of the two outputs from which are taken the symbols reconstructed in reception, the sampling instant $t_o$ being taken as a reference.

FF2 receives the samples $y_n(t_o)$ and supplies at the output the samples $y_n(t_o - T/2)$.

ST indicates a normal subtractor with m bits which subtracts the output signal of FF2 from the input signal of FF1, supplying at the output a signal DIF which represents the expression in square parentheses in formula (7).

ER indicates a block which calculates the error signal $e_n(t_o)$ defined above in (5). ER is thus realized by means of a m bits subtractor, which subtracts from the output signal of FF1 the estimate signal $\hat{y}_n$.

This last signal is supplied by a decision circuit not shown in the figure since it is of known type and already present in the receiver.

The outputs DIF of ST and $\epsilon_n(t_o)$ of ER are connected to the inputs of a normal multiplier ML with m bit inputs; its output M1 can also be limited to the first m-bits of the result.

RE indicates a block which calculates the real part $\Re$ of the expression (7) on the basis of the signals received from the output M1 of the block ML shown in the figure, and from the output M2 of the equivalent block of the part of the circuit not shown, in relation to the other signal component.

RE is embodied by means of a normal m bit adder; at its output there is the control signal $U_n(t_o)$ with a period equal to T/2.

The RE output is supplied to the input of a block FF3 which has the function of bringing the control signal $U_n(t_o)$ to a representation with a single sample for symbol time T. FF3 consists of a group of m flip-flops synchronized by a signal CK2 having period T, taken from the timing signal CK through a divider by two circuit DV.

The control signal at the output of FF3 is then converted into analog form by a digital-analog converter DA and subsequently filtered by a filtering network PB of the low-pass type and supplied to a normal local voltage-controlled oscillator VCO.

As already explained, the VCO oscillates at a nominal frequency double that of the symbol and supplies at the output the timing signal CK.

Numerous variants of the circuit described in FIG. 1 are possible within the scope of the invention.

For example it is possible to do without the operation of base band equalization performed by the block EQ without degrading significantly the overall performance of the circuit.

It is also possible to reduce the number of significant bits of the result of the sum performed by the block RE, and even consider only the sign bit, and still obtain the desired result of correct timing recovery.

While the present invention has been described in connection with a preferred embodiment thereof, it is to be understood that additional embodiments, modifications and applications which will become apparent to those skilled in the art are included within the spirit and scope of the claims appended hereto.

We claim:

1. A method for timing recovery in receiving base band digital signals converted into a sequence of symbols having a symbol interval, said sequence of symbols being sampled by a timing signal to obtain two reconstructed signal samples per symbol interval, wherein said timing signal has a nominal period equal to half said symbol interval and is phase controlled by a control signal, wherein the control signal is derived at each sampling period by the steps of:
    deriving a reconstruction error signal;
    calculating the difference between the reconstructed signal samples of the preceding and the following sampling period;
    obtaining said control signal by the product of said reconstruction error signal and said difference.

2. A method for timing recovery in accordance with claim 1, wherein the reconstruction error signal is derived at each sampling period by calculating the difference between the reconstructed sample of the same sampling period, and an estimated signal $y_n$ of said reconstructed sample, said estimated signal being constant in the symbol interval.

3. A method for timing recovery in accordance with claim 1 further including performing a base-band transverse adaptive filtering operation with adaptable filter coefficients on said reconstructed samples.

4. A method for timing recovery in accordance with claim 1, including synchronizing the control signal with a clock signal having a period equal to said symbol interval and obtained by dividing by two said timing signal.

5. A timing recovery circuit for the reception of baseband complex digital signals sampled through a timing signal to obtain two samples of a reconstructed complex signal per symbol interval including:
    means for providing said timing signal with a nominal period equal to one-half of said symbol interval, said means being obtained from a local oscillator means controlled by a control signal;
    two analog-digital converters with m bits for sampling the components of said complex digital signal on the basis of said timing signal;
    means for taking two sequences of received signal samples having two circuit branches for each of said components, each of said branches comprising:
        an adaptive transverse filter having 2L+1 taps and adaptable coefficients which are synchronized by said timing signal;
        means for filtering the sequence of received signal samples to obtain a sequence of reconstructed samples;
        a first block of m flip-flops which are synchronized by said timing signal, delay by a time equal to one-half symbol interval the reconstructed samples received from said transverse filter;
        a second block of m flip-flops which are synchronized by said timing signal, and delay by a time equal to one-half said symbol interval the reconstructed samples received from said first block;
        a first m-bit subtractor which subtracts the output of said second block from the output of said adaptive transverse filter;
        a second m-bit subtractor which subtracts from the reconstructed samples, present at the output of said first block, an estimate signal of said reconstructed samples, to obtain a reconstruction error signal;
        a multiplier which multiplies the output signals of said first and second subtractor; and
        an adder for adding the output of the multipliers of said two branches, said adder deriving said control signal.

6. A timing recovery circuit as set forth in claim 5, wherein the output of said adder is coupled to a third block of m flip-flops synchronized by a signal taken by a divisor which divides by two said timing signal.

7. A method for timing recovery in receiving base band digital signals converted into a sequence of symbols having a symbol interval, said sequence of symbols being sampled by a timing signal to obtain two reconstructed signal samples per symbol interval, wherein said timing signal has a nominal period equal to half said symbol interval and is phase controlled by a control signal, and wherein the control signal is derived at each sampling period by the steps of:
    deriving a difference signal between the reconstructed signal samples of the preceding and the following sampling periods;
    deriving a reconstructed error signal at each sampling period;
    deriving the product of said difference signal and said reconstructed error signal.

* * * * *